Oct. 25, 1949.　　　　　A. J. BRIGGS　　　　　2,486,252
MACHINE FOR FORMING AND APPLYING HOOD CAPS TO BOTTLES
Filed Nov. 17, 1944　　　　　　　　　　　　7 Sheets-Sheet 1

Fig. 1.

INVENTOR:
Arthur J. Briggs,
BY
Bodell & Thompson
ATTORNEYS.

Oct. 25, 1949.　　　A. J. BRIGGS　　　2,486,252
MACHINE FOR FORMING AND APPLYING HOOD CAPS TO BOTTLES
Filed Nov. 17, 1944　　　7 Sheets-Sheet 4

Oct. 25, 1949.  A. J. BRIGGS  2,486,252
MACHINE FOR FORMING AND APPLYING HOOD CAPS TO BOTTLES
Filed Nov. 17, 1944  7 Sheets-Sheet 5

FIG-7

INVENTOR:
Arthur J. Briggs,
BY Bodell & Thompson
ATTORNEYS.

Oct. 25, 1949.  A. J. BRIGGS  2,486,252
MACHINE FOR FORMING AND APPLYING HOOD CAPS TO BOTTLES
Filed Nov. 17, 1944  7 Sheets-Sheet 6

_FIG.8_

INVENTOR:
Arthur J. Briggs,
BY
Bodell & Thompson
ATTORNEYS.

Patented Oct. 25, 1949

2,486,252

UNITED STATES PATENT OFFICE 2,486,252

MACHINE FOR FORMING AND APPLYING HOOD CAPS TO BOTTLES

Arthur J. Briggs, Syracuse, N. Y., assignor of one-half to William L. Hinds, Fayetteville, N. Y.

Application November 17, 1944, Serial No. 563,842

7 Claims. (Cl. 226—83)

This invention relates to a machine for forming hood caps for bottles from flat disks of sheet material, and applying the formed hoods to the bottles.

The invention has as an object a machine operable automatically through a cycle each time a bottle is arranged in capping position to form a cup-shaped cap or hood from a flat disk of sheet material and apply the formed hood to the top of the bottle, and to press or form the skirt portion of the hood about the neck of the bottle. The hood thus applied may be self securing by means of an adhesive coating applied to the hood, or the hood may be secured to the bottle top by a subsequent operation as, for example, securing a flexible retaining band about the skirt of the hood as disclosed in my Patent No. 2,364,776, issued December 12, 1944, and of which this application is a continuation in part.

The invention has as a further object a machine of the type referred to including mechanism for successively removing flat disks of sheet material from a supply magazine, forming the disks into hoods, and subsequently transferring the formed hoods to the tops of the bottles.

The invention consists in the novel features and in the combinations and constructions hereinafter set forth and claimed.

In describing this invention, reference is had to the accompanying drawings in which like characters designate corresponding parts in all the views.

The machine is supported on a column 20 mounted on a suitable base 21. During the capping operation, the bottle is supported on a bottle support 22 which is arranged in the center of a table 23 carried by an arm 24 provided with a split hub 25 apertured to slidably receive the column 20 and which is retained against rotation thereon by a key 26. The hub 25 is clamped to the column by means of a hand bolt 27.

The hood forming and applying mechanism is arranged in or supported by a housing having end walls 30, 31, a rear wall 32, and a top wall 33. This housing is secured to a gear housing 35 apertured to receive the column 20 and being likewise retained against rotation on the column by the key 26, and being clamped to the column as by hand bolt 36. The two housings are secured together as by bolts 38, and the housings are adjustable vertically on the column 20 by a screw 40 having threaded engagement with a nut 41 secured to the gear housing 35 and being journalled at its lower end in a bracket 47. The screw 40 is connected to a shaft 49 horizontally journalled in the bracket 47 by beveled gears 50, and the outer end of the shaft 49 is formed to receive a suitable crank. With this arrangement, relative axial movement can be effected between the table 23 and the upper housing carrying the hood forming and applying mechanism. Usually, the table 23 is arranged in the plane of the bottle conveyor extending from the bottle filling machine, and the upper housing is adjusted to accommodate bottles of different sizes, such as half pints, pints and quarts.

A drive motor 55 is mounted on top of the gear housing 35 and is operatively connected to a shaft 56 journalled in the gear housing and provided with a worm meshing with a worm wheel 57. As shown, the motor is provided with a pulley 58, and the shaft 56 with a pulley 59, the drive being effected by a belt 60 trained over these pulleys.

Figure 4:
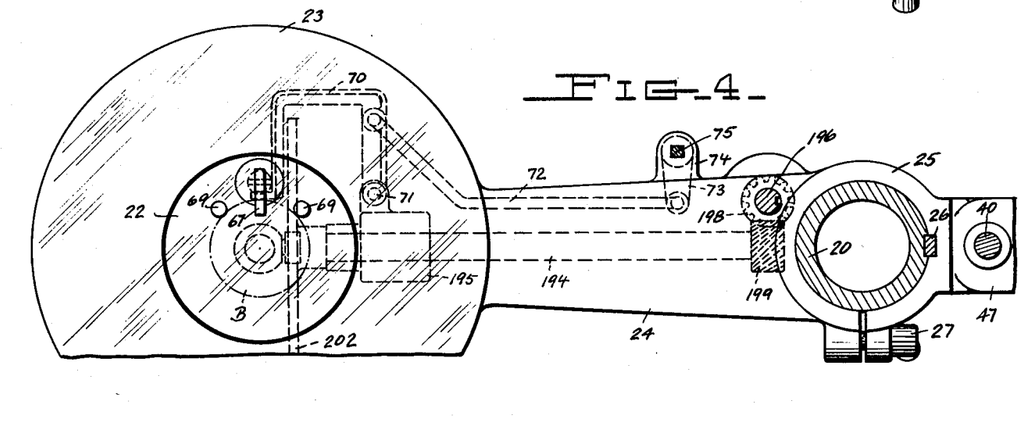
Figure 4 is a view taken on line 4—4, Figure 1.

The disk transfer, hood forming, hood transfer and applying mechanisms are operated from a shaft 62 journalled horizontally in the end walls 30, 31 of the supporting housing. A circular member 63 is keyed to the inner end of the shaft 62. The worm wheel 57 is mounted upon the member 63 and is connected thereto by a one revolution clutch which is tripped by the bottle B engaging the trip member 67. This trip member is carried by the table 23 and so positioned that when a bottle is placed upon the bottle support 22 in engagement with bottle positioning members 69, the side of the bottle will engage the trip 67 moving it radially outwardly, Figure 4. The bottle trip is pivotally connected to one leg of a U-shaped member 70 journalled at its opposite end, as at 71, to the under side of the table. A link 72 is pivotally connected at one end to the U-shaped member 70, and at its opposite end to an arm 73 journalled in a bracket 74 carried by the arm 24, the lever being provided with a square aperture to receive a rod 75 depending from the motor housing and being provided at its upper end with means for tripping the one revolution clutch. Accordingly, when a bottle is placed upon the bottle support 22 and moved into engagement with the bottle positioning members 69, the trip 67 is engaged which, in turn, effects tripping of the one revolution clutch, whereupon the shaft 62 makes one revolution which constitutes the cycle of the machine and which effects transfer of a disk from the disk magazine, forming the disk into hood formation, and applying a hood to the top of the bottle.

The hoods are formed from disks of thin sheet material such as paper, cellophane, plastic material, foil, etc. The disks D are arranged in stack formation in a tubular magazine 90 mounted upon the rear wall 32 of the housing, as by a clamp 91. The lower end of the magazine 90 is opened and provided with a plurality of inwardly extending projections 94 to support the stack of disks. The disks are successively withdrawn from the bottom of the magazine by a disk transfer comprising a cylindrical member 95 mounted on a stem 96 which, in turn, is supported on an arm 97 secured to the lower end of a stem 98. The stem 98 is slidable vertically in a boss 100 formed adjacent the lower edge of the rear wall 32 of the housing and an aperture formed in the top wall 33.

A recessed collar 101 is secured to the stem 98 to receive a fork 102 secured to a rod 103 arranged parallel to the stem 98 and slidably mounted in a boss 104 extending inwardly from the rear wall 32 and in the top wall 33, and being connected at its upper end to a link 105 which, in turn, is pivotally connected to an arm 106 secured to a horizontally arranged shaft 107 journalled in brackets formed in the top wall 33. A depending arm 108 is secured to the opposite end of the shaft 107 and is provided at its lower end with a roller 109 engaging the cam 110.

Figure 1:
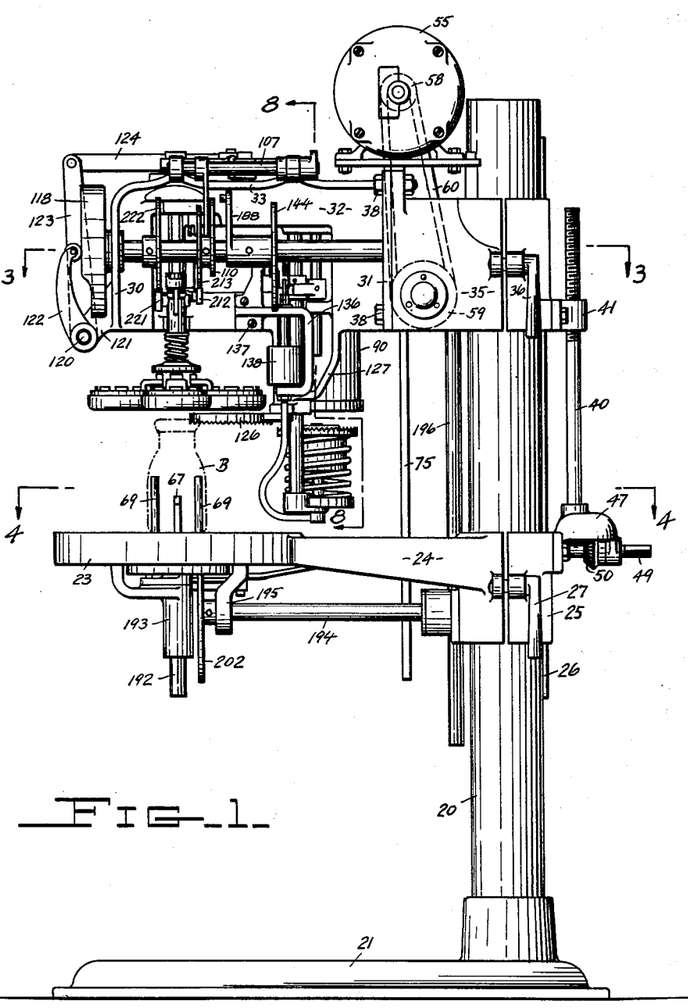
Figure 1 is a front elevational view of a machine embodying my invention.

An elongated pinion 115 is secured to the upper end of the stem 98 and is engaged by gear teeth 116 formed on an oscillatable member 117. This member is oscillated by cam 118 secured to the outer end of the main shaft 62. A shaft 120 is journalled in a boss 121 extending outwardly from the outer end wall 30 of the housing. An arm 122 is secured to the shaft 120 and provided at its free end with a roller engaging the cam 118. An arm 123 is secured to the opposite end of the shaft 120 and is pivotally connected at its upper end to a link 124. The opposite end of this link is pivotally connected to the oscillatable member 117, see Figures 1 and 2. Thus, the member 117 is oscillated upon rotation of the main shaft 62 and likewise, the stem 98 is oscillated to move the disk transfer member 95 from a position in register with the bottom of the magazine 90 to a position in register with an annular hood forming member 126 secured to a bracket 127 depending from the housing as by screws 128 and, during this oscillating movement of the disk transfer, it is also moved vertically. The arrangement is such that when the disk transfer is moved into register with the stack 90 by cam 118, it is moved upwardly by cam 110 to engage the lowermost disk in the stack formation. It is then permitted to descend, whereupon the stem 98 is oscillated to move the member 95, with a disk thereon, in register with the hood forming member 126, see Figures 5 and 6. Thereupon, the cam 110 effects substantial elevation of the transfer member to move the member, with the disk thereon, upwardly through the hood forming member 126.

The disk is retained on the member 95 during its transfer by means of vacuum effected as follows: The stem 96 is formed with an aperture 130. The stem 96 is shouldered at its lower end and is secured to the arm 97 by a nut 131 formed with an aperture 132 extending radially inwardly and communicating with the aperture 130, see Figure 9. The piston 135 is secured in a U-shaped bracket 136 secured to the housing as by screws 137 and depending therefrom. A cylinder 138 is secured to the lower end of a rod 140 slidably mounted in the upper portion of the bracket 136 and which, at its upper end, is connected to a lever 141 by a link 142. The lever 141 is provided at its outer end with a roller 143 engaging a cam 144. The cam effecting upward movement of the stem 140 and the cylinder 138 carried thereby, thus creating a vacuum on the top of the stationary piston 135. The piston is formed with an aperture 145 which is connected to the aperture 132 by means of a flexible conduit 146.

The arrangement of the cam 144 relative to the cam 110 is such that when the stem 98 is elevated by the shorter lobe 147 of cam 110 to move the disk transfer 95 into engagement with the bottom disk in the magazine 90, the lobe of cam 144 effects upward movement of the cylinder 138 to thereby apply vacuum through the stem 96, and the vacuum is maintained while the disk transfer is lowered and moved into register with the hood forming member 126.

Figures 9, 10:
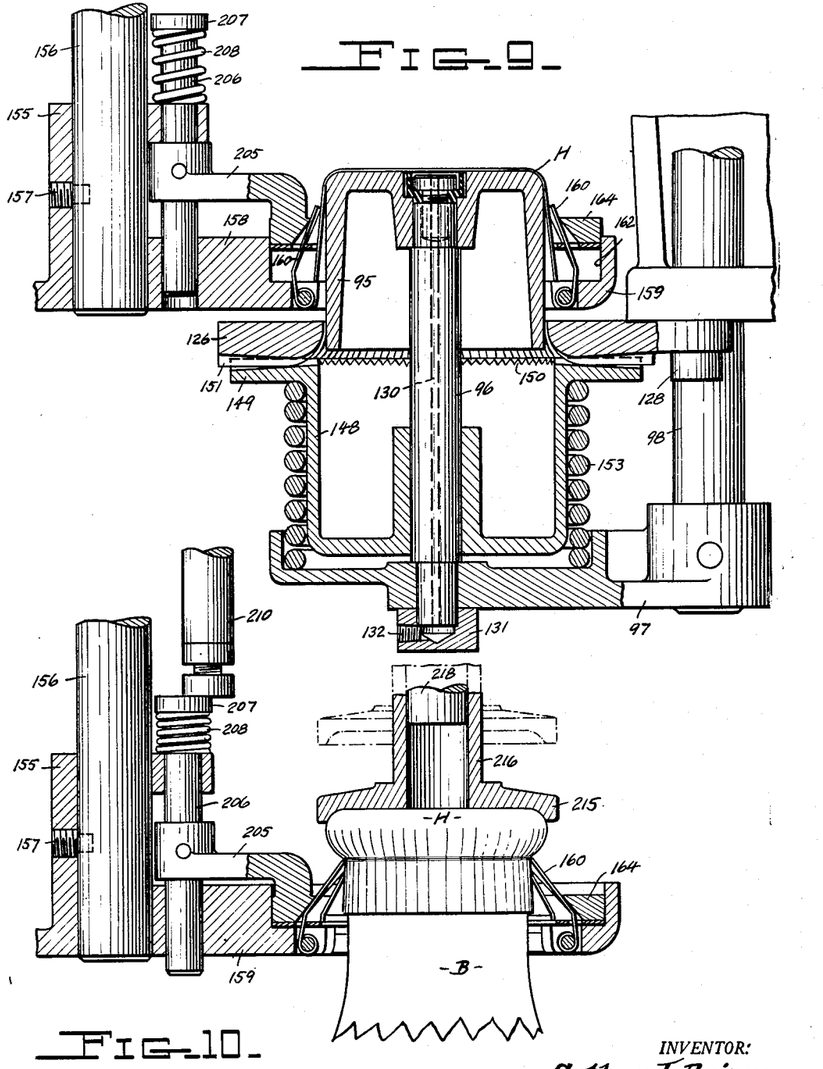
Figure 9 is a view of the hood forming and transfer mechanism taken on line 9—9, Figure 5.
Figure 10 is a view taken on line 10—10, Figure 5.

A cup shaped member 148 is slidably mounted upon the stem 96 and is formed with a radially extending flange 149. This flange is formed with radially extending serrations 150, and the under side of the member 126 is formed with complemental serrations 151, see Figure 9. The cup member 148 is normally maintained so that the flange 149 is positioned just below the marginal portion of the disk D on the member 95 by helical compression spring 153, see Figure 6. When the parts are in this position, the larger lobe of cam 110 effects substantial upward movement of the disk transfer, whereupon the marginal portion of the disk is clamped between the annular forming member 126 and the flange 129 of the cup member 148. Further upward movement of the member 95 through the member 126 causes the disk to be drawn into hood form, as indicated in Figure 9. The purpose of the serrations 150, 151, is to effect a uniform gathering of the material in the skirt of the hood during the forming operation. The formed hood is moved upwardly through a hood transfer member which consists of a turret having a hub portion 155 secured to the lower end of a shaft 156, as by screw 157. The hub 155 is formed with three radially extending arms 158 equally spaced circumferentially and each carrying an annular member 159. A plurality of forming fingers 160 are mounted in each of the members 159 and are spring pressed radially outwardly. The marginal portion of each of the members 159 about the central aperture thereof is recessed as at 162, see Figure 9. The bottom wall of this recess is formed with circumferentially spaced apart notches in which the forming fingers 160 are mounted. These fingers are moved radially inwardly by an annular member 164 formed with a tapered central aperture which, upon downward movement of the member 164, is cooperable to cam the fingers 160 radially inwardly.

Normally, the annular member 164 and the fingers 160 are in the position shown in Figure 9, whereupon when the disk has been formed into the hood H and moved upwardly through the annular members 159. The skirt portion of the hood yieldingly springs outwardly and rests upon the bottom of the shouldered recess 162 and is accordingly retained in the member 159 during downward movement of the disk transfer 95.

Figure 2:
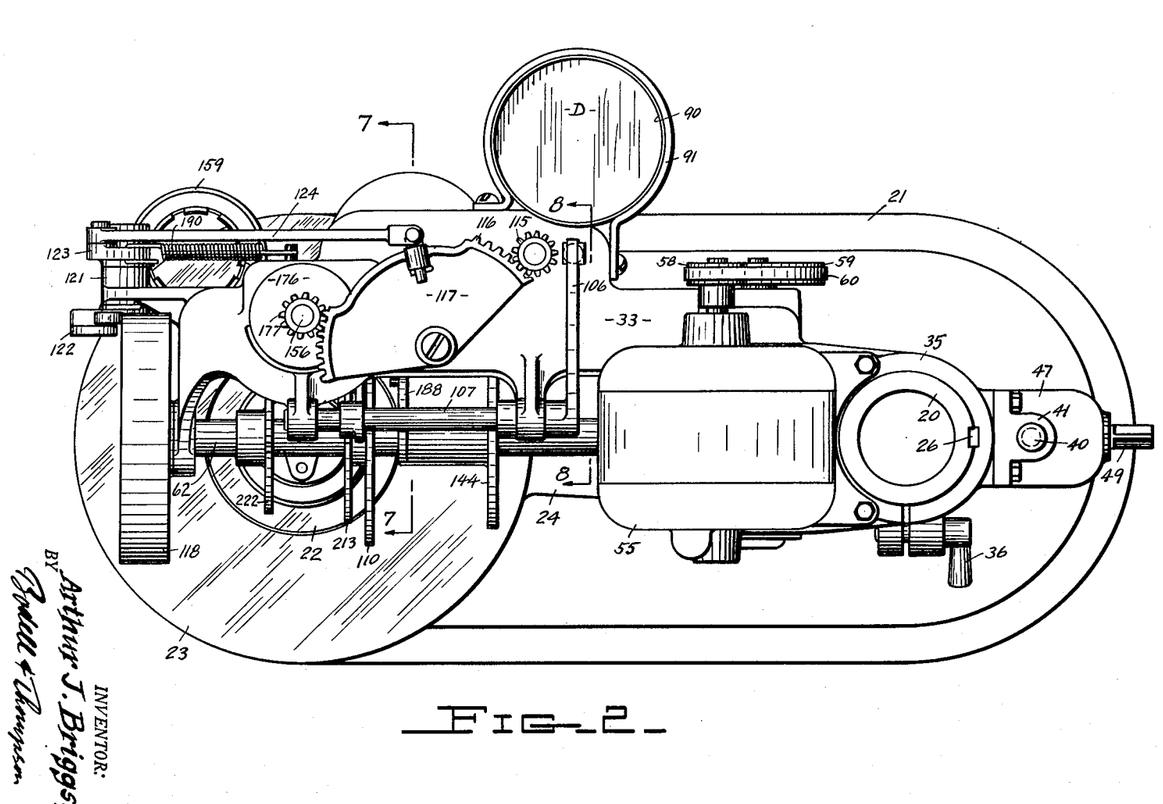
Figure 2 is a top plan view of the machine.
Figure 3:
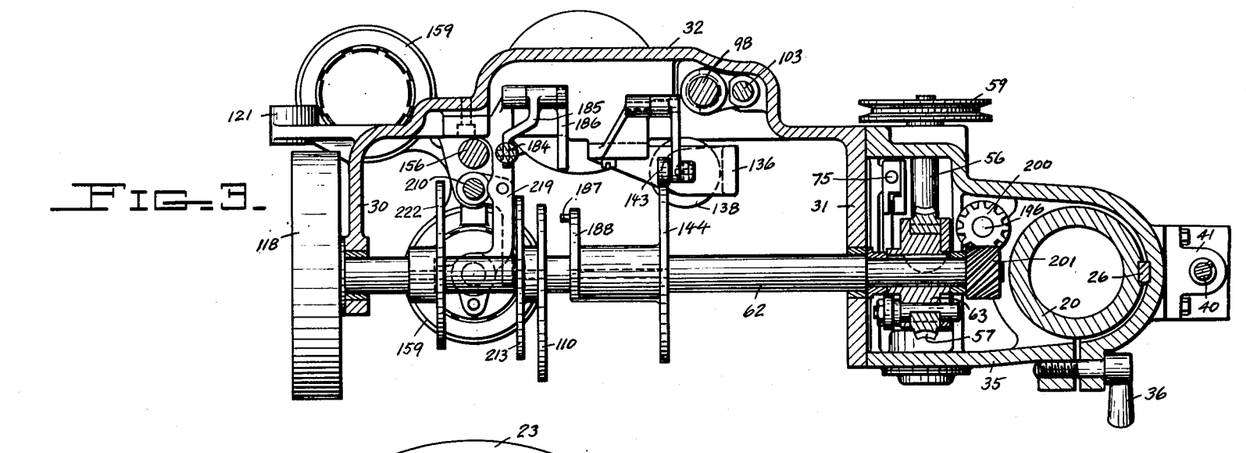
Figure 3 is a view taken on line 3—3, Figure 1.
Figures 5, 6:
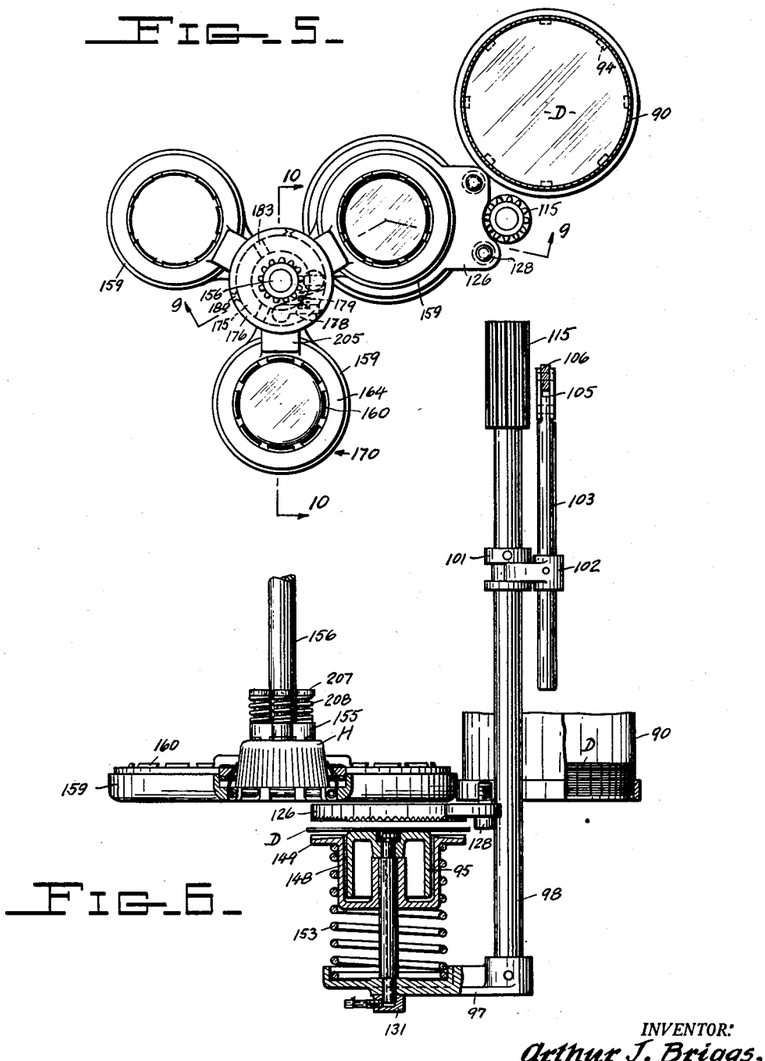
Figure 5 is a top plan view of the disk magazine, disk transfer and hood transfer mechanisms.
Figure 6 is a front elevational view, with parts shown in section, of the structure shown in Figure 5.

With the formed hood thus positioned in one of the members 159 arranged above the forming member 126, the shaft 156 is rotated to index the turret to bring that member 159 to the hood applying position indicated at 170, Figure 5. This indexing is accomplished in the following manner:

The upper end of the shaft 156 has secured to it a cylindrical member 175 and an inverted cylindrical cup shaped member 176 is loosely journalled on the upper end of the shaft and is provided with a pinion gear 177 arranged to mesh with the oscillating member 117, see Figure 2. A pawl 178 is mounted in the member 175, the free end of the pawl being spring pressed outwardly by helical compression spring 179 to engage notches 180 formed in the inner surface of the member 176, see Figure 5. Accordingly, when the member 117 is oscillated in a counterclockwise direction by cam 118, the pinion 177 is rotated in a clockwise direction and, in like manner, the member 175 and shaft 156 are rotated in a clockwise direction, see Figure 5, to index the member 159, with the formed hood therein, to the hood applying position 170, and in this position it is above and in axial alinement with the bottle B positioned on the bottle support 22.

In order that the member 159 may be thus accurately positioned, the under side of the member 175 is provided with notches 183, there being one notch for each of the three members 159, and the notches being also axially spaced circumferentially. A pin 184 is slidably mounted in the top wall 33 of the housing and the upper end of the pin is shaped to engage the notches 183 when the pin is in its up position. A pair of links 185, 186 are pivoted at like ends to the housing, and these ends are connected by complemental gear teeth 187. The free end of the link 185 is connected to the lower end of the pin 184, and the free end of the link 186 is arranged in the path of movement of a pin 187 carried on an arm 188 secured to and rotatable with the main cam shaft 62. The pin is normally maintained in up position by spring 189 secured at one end to the housing and at its opposite end to the link 185, Figure 7.

The arrangement is such that just prior to the movement of the oscillating member 117, the pin 187 engages link 186 causing the pin 184 to be moved downwardly out of the notch 183. Immediately thereupon, the member 117 is oscillated by cam 118 initiating the indexing of shaft 156, and when the indexing has been completed, the pin 184 is moved into the next succeeding notch 183 by spring 189. The oscillating member 117 is returned to normal position by a spring 190, Figure 2.

Relative axial movement is now effected between the bottle on the support 22 and the hood transfer turret to apply the formed hood on the top of the bottle. As here shown, the bottle is elevated to accomplish this purpose. The bottle support 22 is mounted upon a stem 192 slidably mounted in a bracket 193 depending from the under side of the table 23. A shaft 194 is journalled at one end in a bracket 195 also carried by the table 23, and is journalled at its opposite end in the hub portion 25 of the table support. A shaft 196 is mounted vertically adjacent the column 20, being journalled at its upper end in the gear housing 35 and at its lower end in the hub portion 25 of the table support. The shafts 194, 196 are provided with intermeshing gears 198, 199, and the upper end of the shaft 196 is provided with a gear 200 meshing with a gear 201 secured to the end of the cam shaft 62.

The outer end of the shaft 194 is provided with a cam 202 which, upon rotation of the shaft 194, is arranged to effect upward movement of the bottle support 22. The arrangement is such that after the hood turret has been indexed to position a formed hood H over the bottle, the cam 202 effects elevation of the bottle support and the bottle thereon, causing the top of the bottle to move upwardly through the member 159 and simultaneously, the formed hood to be positioned on the top of the bottle.

When the top of the bottle has engaged the top portion of the formed hood, the annular member 164 is moved downwardly causing the fingers 160 to be cammed radially inwardly. Each of the members 164 is mounted upon an arm 205 secured to a rod 206 slidably mounted in the hub portion 155 of the hood turret. Each of the rods 206 is formed with an enlarged head portion 207, and a helical compression spring 208 is arranged between the head 207 and the hub portion of the turret, whereby the rods 206 and the members 164 carried thereby are normally mounted in upward position, as shown in Figure 9. The rods 206 and the members 164 are moved downwardly, as previously stated, by a rod 210 slidably mounted in the main housing of the machine, it being provided with a forwardly extending arm 211 provided with a roller 212 to engage a cam 213. The rod is normally maintained in up position by helical compression spring 214 interposed between the arm 211 and the bottom wall of the housing through which the rod 210 slides. When the elongated lobe of cam 213 engages the roller 212, the arm 211 and the rod 210 are moved downwardly, the lower end of the rod engaging the upper end of rod 206 causing downward movement of the annular cam faced member 164 which, in turn, causes the fingers 160 to move inwardly ironing and pressing the hood about the top of the bottle, see Figures 7 and 10. Previous to the descent of the bottle B, the member 164 is moved upwardly permitting the fingers 160 to move outwardly in the position shown in Figure 9.

Figure 7:
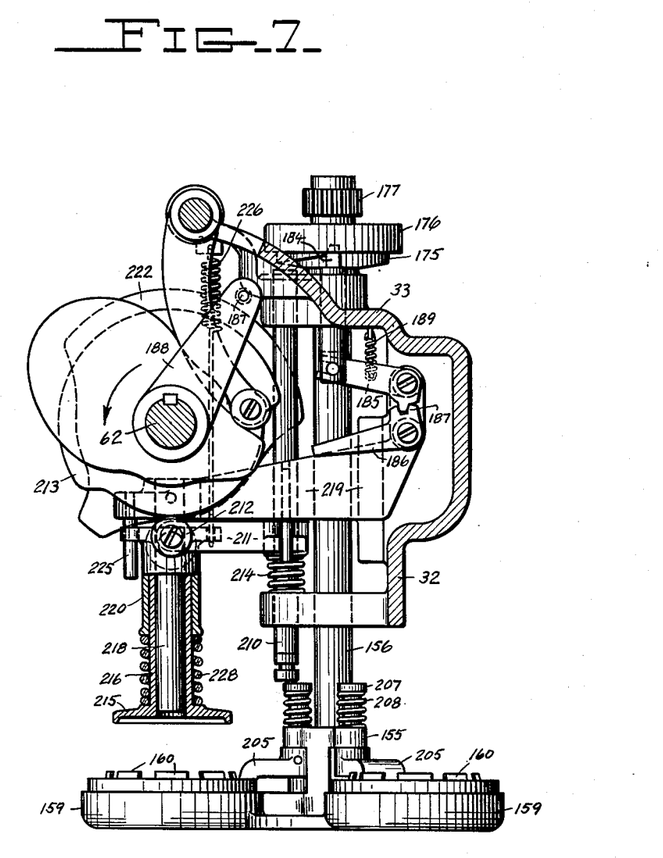
Figure 7 is a view taken on substantially line 7—7, Figure 2, with parts omitted and parts shown in section.
Figure 8:
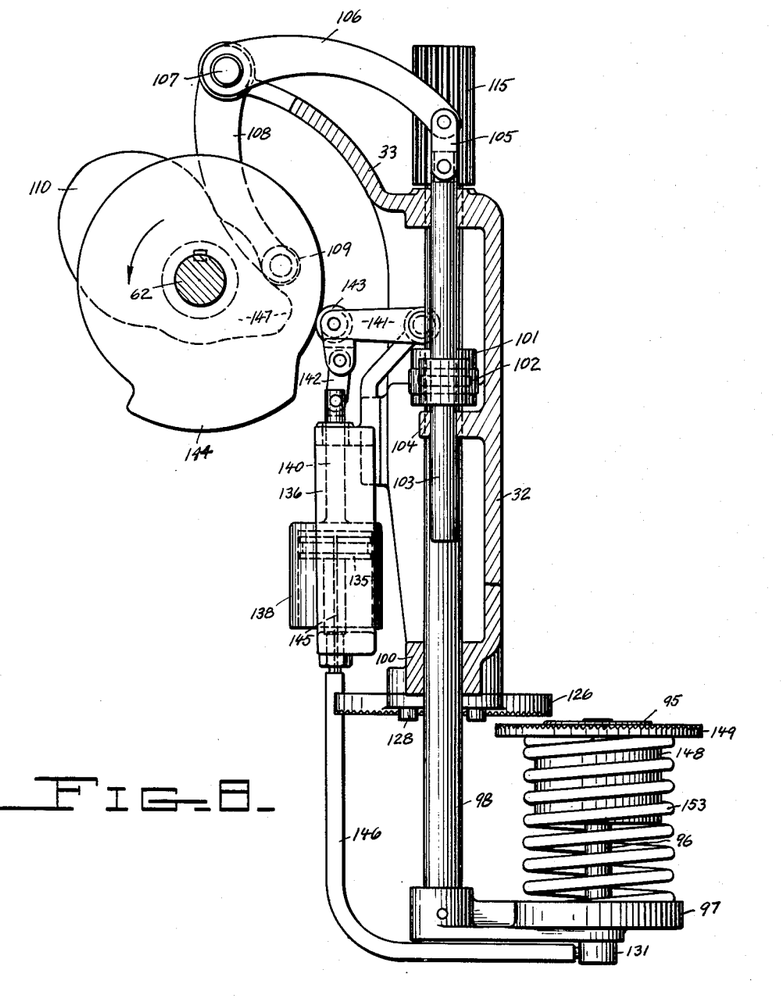
Figure 8 is a view taken on line 8—8, Figures 1 and 2, illustrating the arrangement of the disk transfer mechanism.

To better apply the hood to the bottle top, a presser foot 215 may be employed. The presser foot, see Figures 7 and 10, is formed with an elongated hollow stem portion 216 slidably mounted upon a stem 218 depending from a forwardly extending bracket 219. The upper portion of the stem 216 is encircled by a tubular member 220 provided at its upper end with a roller 221 engaged by a cam 222. The forward side of the upper portion of member 220 is apertured to slidably receive a pin 225 also secured to the bracket 219 and which serves to prevent rotation of the presser foot about the stem 218.

A helical compression spring 226 is secured at one end to the top wall of the housing 33, and at its opposite end to the member 220 normally maintaining it in up position. The upper end of the hollow stem 216 engages the upper end of the member 220, thereby limiting the downward movement of the stem 216 relative to the member 220, and the stem 216 is maintained in the extended position by helical compression spring 228 encircling the stem 216 and being interposed between the presser foot 215 and the lower end of the member 220. This arrangement is such that when the bottle engages the hood, the member 220 and the presser foot 215 are lowered by cam 213 to bring the presser foot into engagement with the top of the hood, as shown in Figure 10. Further upward movement of the bottle effects compression of the spring 228. This arrangement is desirable where hood is to be sealed to the bottle by a retaining member before the bottle is moved downwardly.

The presser foot is not necessary where the hood is sealed to the bottle by an adhesive coating, or by other means such as applying a rubber band about the skirt of the hood.

It will be observed that the machine described is particularly compact and simple in operation, and functions to automatically form hood caps from a stack of flat, thin, disks.

What I claim is:

1. A machine for applying hood caps to bottles comprising a tubular magazine arranged to support a plurality of thin, flexible disks in stack formation, a cap transfer member, a cap forming member, a disk transfer member, mechanism for moving said latter member into engagement with said stack formation and thereafter effecting movement of said member to transfer a disk from said stack formation to said cap forming member, said disk transfer member being cooperable with said cap forming member to form the disk into hood cap form and position the formed cap in said cap transfer member, a bottle support, mechanism operable to move said cap transfer member to position the formed cap above the top of a bottle positioned on said bottle support, and means operable to effect relative axial movement between the bottle support and said cap transfer member to position the cap on the top of the bottle.

2. A machine for applying hood caps to bottles comprising means for supporting a supply of thin, flexible disks in stack formation, a bottle support, a cap transfer member, a cap forming member, a disk transfer member operable to transfer a disk from said supply and being cooperable with said cap forming member to form said disk into hood cap form and to position the formed cap in said cap transfer member with the skirt of the cap depending downwardly, said cap transfer member being operable to position the formed cap in axial alinement above the bottle on said bottle support, and means operable to effect relative axial movement between the bottle support and said cap transfer member to position the cap on the top of the bottle.

3. A machine for forming and applying hood caps to bottles comprising a magazine for supporting a supply of thin, flexible disks in stack formation, a bottle support, a cap transfer member, a cap forming member, means operable to transfer a disk from said magazine and being cooperable with said cap applying member to form said disk into hood cap form and to position the formed cap with the skirt portion depending in said cap transfer member, said cap transfer member being subsequently operable to position the formed cap above a bottle on said bottle support, means operable to effect relative axial movement between the bottle support and said cap transfer member to position the cap on the top of the bottle, and means carried by said cap transfer member and movable into engagement with the skirt portion of the cap when the same is positioned on the bottle to press said skirt portion about the top of the bottle.

4. A machine for forming and applying hood caps to bottles comprising a bottle support, a cap transfer member, a cap forming member, a magazine for supporting a supply of thin, flexible disks in stack formation, a disk transfer member operable to transfer successive disks from said magazine and being operable with the cap forming member to form said disks into hood cap form and to position the formed cap in said cap transfer member with the skirt portion of the cap depending downwardly, said cap transfer member being operable to transfer the formed cap to a position above the top of a bottle on said bottle support, means operable to effect relative axial movement between the bottle support and said cap transfer member to position the cap on the top of the bottle, an annular series of fingers carried by said cap transfer member and being movable into engagement with the skirt portion of the cap to iron said portion about the top of the bottle, and means operable to effect movement of said fingers.

5. A machine for forming and applying hood caps to bottles comprising a bottle support, a magazine arranged to support a plurality of disks formed of thin, flexible sheet material in stack formation, a cap forming member and a cap transfer member, means operable to withdraw the lowermost disk from said magazine and being cooperable with said cap forming member to form said disk into hood cap form and to position the formed cap in said cap transfer member with the skirt portion of the cap depending, said cap transfer member being operable to transfer the formed cap to a position in axial alinement above a bottle on said bottle support, means operable to effect relative axial movement between said cap transfer member and the bottle support to apply the formed cap to the top of the bottle, and means carried by the cap transfer member to yieldingly engage the skirt portion of the cap and contract the same about the top of the bottle.

6. A machine for forming and applying hood caps to bottles comprising a suitable frame, a bottle support, a tubular magazine for supporting a supply of disks formed of thin, flexible material, a cap forming member, a cap transfer member movable from a position in register with said cap forming member to a position in register with a bottle positioned on said bottle support, a disk transfer member movable from a position in register with said magazine to a position in register with said cap forming member, power operated means operable when a bottle is positioned on said bottle support to cause said disk transfer member to transfer a disk from said supply to said cap forming member and in conjunction therewith to form said disk into hood cap form, and to position the formed cap in said cap transfer member, and said power means further effecting movement of said cap transfer member to position the formed cap in register with said bottle and to subsequently effect relative axial movement between the cap transfer member and said bottle support to position the formed cap on the top of the bottle.

7. A machine for applying hood caps to bottles comprising a magazine for supporting a plurality of disks in stack formation, a cap transfer turret provided with a plurality of cap receiving apertures, a cap forming member, a bottle support, indexing mechanism operable to effect rotation of said cap turret and when said turret is at rest to position one of the cap receiving apertures in alinement with said cap forming member, and another of said apertures in alinement with said bottle support, a disk transfer member movable back and forth from a position in alinement with said cap forming member to a position in alinement with said magazine, motion transmitting means operable to move said disk transfer member in register with said magazine, effect upward movement thereof to engage said stack formation, and downward to remove the lowermost disk of said formation and to return said member in register with the cap forming member, said motion transmitting mechanism being further operable to effect movement of said disk transfer member toward said cap forming member to form the disk into hood cap form and to move the formed cap into the alined aperture in said cap transfer member, said indexing mechanism being subsequently operable to move said aperture in register with the bottle support, and means effecting relative axial movement between the bottle support and the cap transfer member to position the formed cap on the top of the bottle.

ARTHUR J. BRIGGS.

REFERENCES CITED

The following references are of record in the file of this patent:

UNITED STATES PATENTS

| Number | Name | Date |
| --- | --- | --- |
| 1,884,952 | Wright et al. | Oct. 25, 1932 |
| 1,956,214 | Booth | Apr. 24, 1934 |
| 2,314,918 | Baule | Mar. 30, 1943 |

Disclaimer 2,486,252.—*Arthur J. Briggs*, Syracuse, N. Y. MACHINE FOR FORMING AND APPLYING HOOD CAPS TO BOTTLES. Patent dated Oct. 25, 1949. Disclaimer filed Dec. 28, 1953, by the assignee, *William L. Hinds*.

Hereby enters this disclaimer to claims 1 to 7, inclusive, of said patent.

[*Official Gazette February 9, 1954.*]